United States Patent Office 3,290,943
Patented Dec. 13, 1966

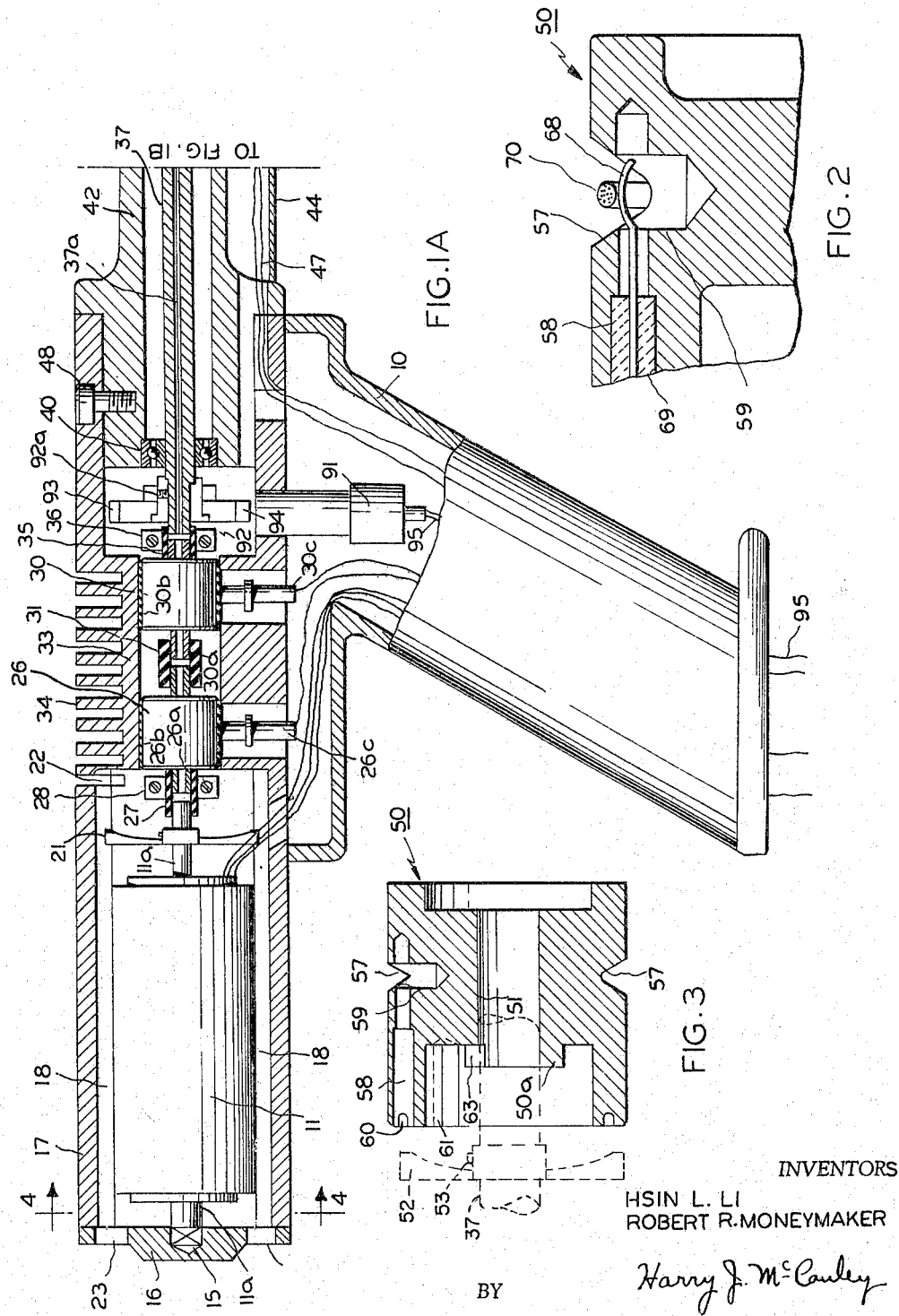

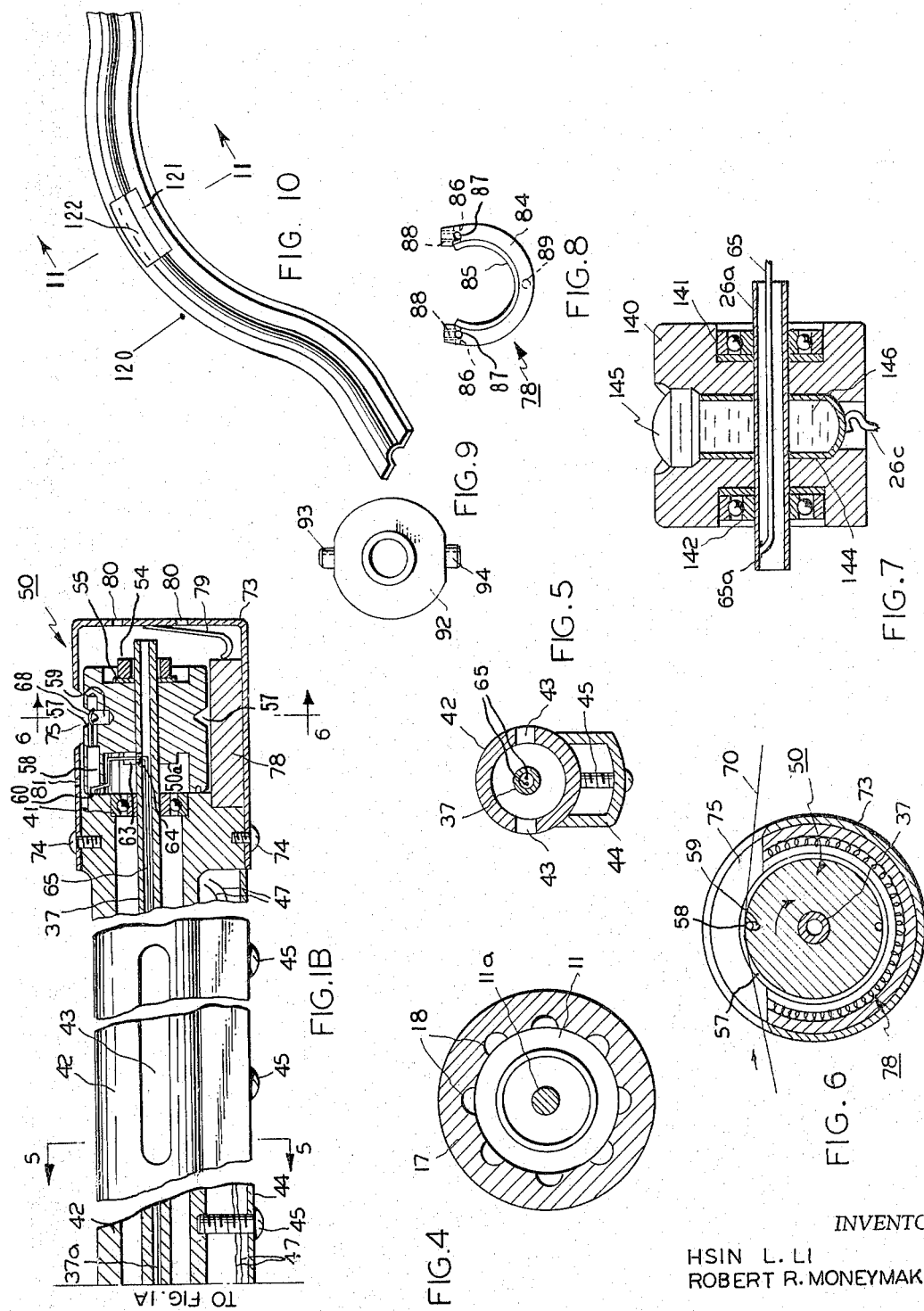

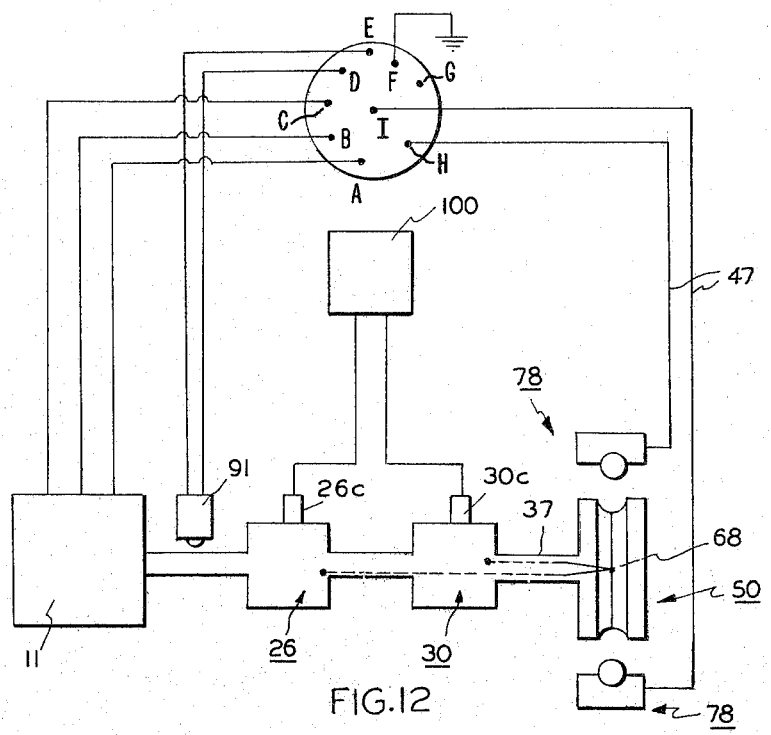
FIG.12
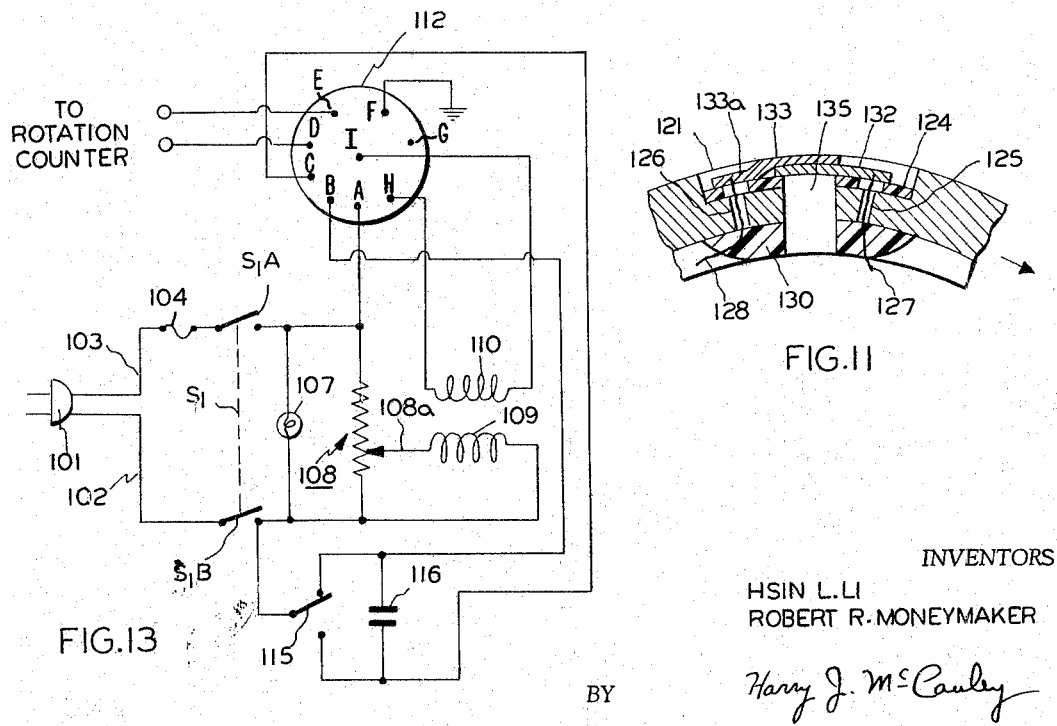
FIG.13
FIG.11

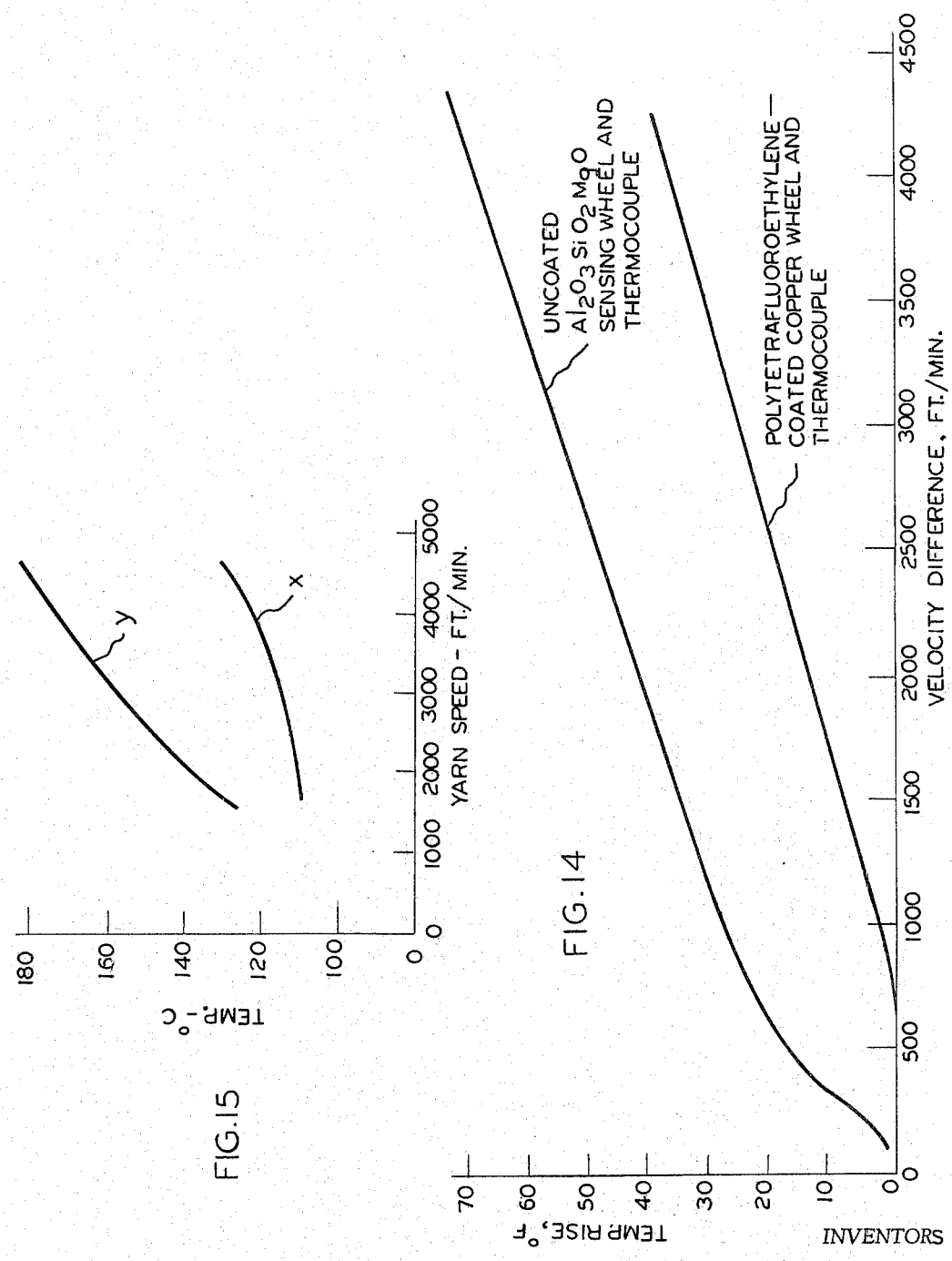

3,290,943
METHOD AND APPARATUS FOR TEMPERATURE MEASUREMENT
Hsin L. Li, Wilmington, and Robert R. Moneymaker, Newark, Del., assignors to E. I. du Pont de Nemours and Company, Wilmington, Del., a corporation of Delaware
Filed July 2, 1964, Ser. No. 379,979
4 Claims. (Cl. 73—359)

This invention relates to a method and apparatus for temperature measurement, and particularly to a method and apparatus for the determination of the surface temperatures of running yarns, webs and the like.

There is great need for a device capable of measuring the surface temperature of a running yarn, web or like structure in the course of its manufacture, conversion or subsequent treatment. Optical pyrometers are not entirely satisfactory in this service, because of their high cost, lack of portability, and associated instrumentation, and apparatus utilizing thermocouples or equivalent surface contact temperature-sensing elements have proved objectionable because of large thermal inertia, slow response time, inaccuracy or ambiguity in the readings, excessive frictional heat generation and lack of instrument portability.

An object of this invention is to provide an improved method and apparatus for the measurement of the surface temperature of running yarns, webs and like structures. Another object is to provide a portable temperature measuring instrument adapted to the determination of temperatures of running yarns and webs in relatively restricted quarters, and one which is easy to manipulate, economical in first cost and maintenance, and accurate in its readings. Other objects of this invention will become apparent from the following detailed description and the drawings, in which:

FIG. 1A, together with FIG. 1B which is a longitudinal extension of FIG. 1A, is a broken side elevational cross-section view of a preferred embodiment of this invention particularly adapted to measure the surface temperature of a running yarn, details of the thermocouple mounting and one of the ventilation fans (FIG. 1B) being omitted from this showing because of the reduced scale of the drawing, FIG. 2 is a detail view in side elevation cross-section of one embodiment of thermocouple employed in the apparatus of FIGS. 1A and 1B shown mounted in place on the sensing wheel, FIG. 3 is a side elevational cross-section view of the sensing wheel of the apparatus of FIG. 1, the thermocouple being omitted in this showing but the ventilation fan omitted from FIG. 1B being represented herein in broken line representation, FIG. 4 is a section taken on line 4—4, FIG. 1A,
FIG. 5 is a section taken on line 5—5, FIG. 1B,
FIG. 6 is a section taken on line 6—6, FIG. 1B,
FIG. 7 is a side elevational cross-section view of one of the cold junction assemblies of the apparatus of FIGS. 1A and 1B,
FIG. 8 is a side elevational end view of the reference heater of the apparatus of FIGS. 1A and 1B,
FIG. 9 is a side elevational end view of the magnetic transducer employed for rotational speed ascertainment in the apparatus of FIGS. 1A and 1B,
FIG. 10 is a perspective view of an alternate design of thermocouple particularly adapted to the measurement of temperatures of running webs or films,
FIG. 11 is a section on line 11—11, FIG. 10,
FIG. 12 is a schematic circuit diagram of the thermocouple circuit of the apparatus of FIGS. 1A and 1B,
FIG. 13 is a schematic circuit diagram of the reference heater control circuit of the apparatus of FIGS. 1A and 1B,
FIG. 14 is a plot of temperature rise due to friction vs. velocity difference between thermocouple and dry yarn in temperature measurement for two different surface compositions of sensing wheel and thermocouple, and
FIG. 15 is a comparative plot of temperature measurement as a function of yarn speed for a static thermocouple, a constant speed (500 ft./min.) rotating thermocouple according to this invention, and a non-contacting radiation gage temperature-sensing standard employed on a steam jet-heated yarn.

Generally, this invention comprises a method for measuring the temperature of running yarns, webs and the like comprising, in sequence, (1) rotating a thermocouple into and out of contact with an object the temperature of which is to be determined in a sense generally co-directional with the direction of travel of the object during a portion of each cycle of rotation followed by exposing the thermocouple to the heat output of a reference heater during at least a portion of the remainder of the cycle of rotation, (2) removing the thermocouple from cyclic contact with the object but continuing exposure of the thermocouple to the heat output of the reference heater, determining the direction and approximate magnitude of heat transfer occurring between (1) and (2) with respect to the thermocouple in the course of its cyclic contact with the object, adjusting the heat output of the reference heater so that the thermocouple and the object are at substantially the same temperature level, and then obtaining an indication of the temperature level as a function of the E.M.F. output of the thermocouple, together with an apparatus for effecting the temperature measurement.

Referring to FIGS. 1A and 1B, a preferred embodiment of apparatus according to this invention comprises the 15″ overall length device therein shown, provided with a pistol-type hand grip 10 for the convenient one-handed manipulation of the instrument by an operator. Preferably, temperature measurements are conducted at sensing wheel speeds approximating those of the running yarn or web in examination, and a powered drive is accordingly provided consisting of motor 11 direct-connected to sensing wheel 50 as hereinafter described.

The outboard end of drive shaft 11a of motor 11 is journaled in bearing 15 carried by end cap 16 closing the motor housing 17, which is drilled longitudinally, as shown in FIG. 4, to provide a number of equiangularly disposed flutes 18, in this instance eight in total number, providing ample space for the forced circulation of cooling air therethrough. This cooling air is supplied by fan 21 drawing in atmospheric air through aperture 22 in housing 17 and expelling it, after passage longitudinally of motor 11, out through discharge ports 23 drilled in end cap 16. Power-transmitting connection of the inboard end of motor shaft 11a is effected to cold junction slip-ring assembly 26 via shaft 26a, to which the end of shaft 11a is coupled by neoprene bushing 27 compressed circumferentially by clamp 28. The aligned shaft ends are spaced one from another in order to electrically insulate shaft 26a from shaft 11a.

A pair of cold junctions is employed for contact voltage equalization in the thermocouple circuit hereinafter described, and the second cold junction assembly of the pair is denoted at 30, power connection to the shaft 30a of which is effected by neoprene bushing 31 which simultaneously electrically insulates cold junction assembly 26 from assembly 30. The full lengths of shafts 26a and 30a are drilled axially to provide a passage in prolongation with the bore 37a of extension shaft 37 through which the thermocouple leads, such as 65 of FIG. 7, are passed to make electrical connection with the slip rings of cold junction assemblies 26 and 30.

The exteriors of the housings of the cold junction assemblies 26 and 30 are electrically insulated from the inside of housing 33 by rubber sleeves 26b and 30b, housing 33 being provided with cooling fins 34 to insure temperature equalization throughout the space occupied by the two cold junctions. The stationary electrical connections to the cold junctions are via terminals 26c and 30c, respectively, the leads to which are drawn off through the hollow interior of pistol grip 10.

Cold junction assemblies 26 and 30 can be identical in construction and preferably comprise conventional mercury bath slip rings of the general design shown in FIG. 7. These utilize a stainless steel housing 140 provided with small bearings 141 and 142, within which is journaled the shaft 26a, using assembly 26 as the example. As seen in the drawing, individual thermocouple leads 65 run to each cold junction assembly individually and make electrical circuit with the inside bores of the rotating shafts by silver solder connection such as that denoted 65a. The shaft rotatably passes through drilled holes in the walls of metal capsule 144, closed at the top by screw cap 145, which capsule is filled with Hg metal 146, so that excellent electrical contact is effected between the shaft, corresponding to the slip ring part of the assembly, and the mercury metal, constituting the brush. Electrical lead 26c is secured in firm electrical contact with capsule 144, as by silver soldering or the like, so that the E.M.F. is drawn off with practically zero contact resistance loss.

As seen in FIG. 1A, the left-hand end of shaft 37, is spaced from the right-hand end of shaft 30a by a neoprene bushing 35 compression-tightened about the abutting shaft ends by clamp 36, which bushing simultaneously electrically insulates cold junction assembly 30 from shaft 37.

A rather long extension shaft 37 (typically 10.5" length) is preferred as a means of isolating the hot junction of the thermocouple and the reference heater hereinafter described, and this is journaled at opposite ends in bearings 40 and 41 carried within barrel housing 42, attached to the right-hand end of housing 17 by machine screws 48. Housing 42 is slotted longitudinally on opposite sides as denoted at 43 (refer also FIG. 5) to facilitate exposure to the atmosphere. A channel raceway 44 for the accommodation of the reference heater electrical leads 47 is provided on the underside of housing 42, to which it is attached by machine screws 45.

Sensing wheel 50, shown in largest scale in FIG. 3, is bored at 51 for concentric mounting on extension shaft 37, being locked longitudinally thereon by tight placement between air sweep fan 52 fixed on the left-hand side to shaft 37 by set screw 53 and lock nut 54 threaded on the shaft end, provided with inside compression washer 55 bearing against wheel 50 from the right.

Sensing wheel 50 is machined circumferentially with a V-shaped groove 57 for the in-line guidance of the sensing wheel with reference to the object the temperature of which is sought, in this instance a running yarn strand. A thermocouple mounting passage is provided in the form of drilled bore 58 co-parallel with wheel bore 51, which opens at the inner end into a radial blind bore 59 approximately ⅜" deep. The left-hand face of wheel 50 is circumferentially machined to define a continuous 360° groove 60 provided with a pair of angularly separated longitudinal slots 61 (only one of which is shown in FIG. 3) through which the thermocouple leads 65 (FIG. 1B) are run to a radial slot 63 cut in the wheel hub 50a, and thence through a radial port 64 drilled through the wall of extension shaft 37, the bore of which constitutes the conductor raceway leading to cold junction assemblies 26 and 30.

Sensing wheel 50 can be fabricated from a variety of wear-resisting substances, good service having been obtained with an $Al_2O_3$-$SiO_2$-$MgO$ composition such as that marketed under the trade name "AlSiMag" by American Lava Corp. However, to minimize friction resulting from a difference in speed between the object in measurement and the apparatus, wheels 50 constructed of silver, brass, copper, aluminum or its alloys coated over the sample-contacting surfaces with polytetrafluoroethylene are preferred. Where differential speed is a problem, as hereinafter described, the thermocouple hot junction can also be sheathed by a thin coating of polytetrafluoroethylene.

Referring to FIG. 2, the details of thermocouple mounting are shown. The hot junction of the thermocouple is denoted at 68, which is mounted as a cantilever of about ¼"–1" length by outboard support from its ceramic sheath 69, anchored within bore 58 with epoxy resin or the like. The hot junction and its adjacent lead length extends transversely across bore 59, out of contact at all times with sensing wheel 50, thereby being free from direct heat-conductive relationship with the wheel. The hot junction underlying running yarn 70 is bent to a convex profile for improved surface contacting with the sample, and the cantilever construction described is effective in imposing an invarient yarn-contacting force of approximately 24 gms., for a ¼" cantilever (3 gms., for a ½" cantilever) to taut yarns, so that temperature measurements are independent of varying sample-contacting loadings.

Conventional rapid response thermocouples can be utilized according to this invention, the following equation being useful in the selection:

$$S_m = \frac{KDa}{\gamma}$$

where, $S_m$ = the maximum speed in ft./min. of the surface the temperature of which is to be measured, $K$ = a proportionality constant (numerically equal to 3 in reciprocal degrees with reference to the angle of wrap hereinafter specified), $D$ = the diameter of sensing wheel 50 (in ft.), $a$ = the angle of sample wrap around sensing wheel 50, in degrees, and $\gamma$ = the response time of the thermocouple, in mins.

Typical thermocouples which have performed well include stainless steel-sheathed types having the leads adjacent the hot junction heat-insulated with a ceramic coating. Thus, for service in the 0–1500 ft./min. speed range, employing a 1–2" dia. sensing wheel having a 10° sample angle of wrap, a chromel-constantan Baldwin-Lima-Hamilton Corp. catalog No. TCRC–FS–25 of 250 millisec. time constant in air proved entirely satisfactory. On the basis of test experience, a 10 denier nylon monofilament moving at 9000 ft./min. would require a somewhat larger sensing wheel (typically, 3" dia.), with a yarn wrap of approximately 20° and a faster response thermocouple of about 100 millisec. time constant for best results.

The cross-sectional arrangement of the sensing wheel with respect to the sample is shown in FIG. 6, thermocouple details being omitted from this view because of the small scale. It is preferred to enclose the sensing end of the apparatus within a cap 73 attached to the outboard end of barrel housing 42 by machine screws 74, which cap is slotted for about 90° of its peripheral expanse, as denoted at 75, to permit free access of sensing wheel 50 to sample contact. Reference heater 78, detailed in FIG. 8, is conveniently held in place by compression spring retainer 79 bearing against the inside surface of the end of cap 73. Preferably, cap 73 is provided with air inlet ports 80 (typically, six in number, of ⅛" dia. spaced equiangularly apart at 60° intervals) to provide a sweep of temperature-equalizing gas across the face of reference heater 78 and the periphery of sensing wheel 50, with exhaust of the air through ports 81 disposed near the rear of the cap. This air circulation is provided by air sweep fan 52 hereinbefore described.

Referring to FIG. 8, reference heater 78 comprises a ceramic support 84 of horseshoe shape provided on the inside surface with a circularly formed electrical resistance heating element 85 adapted to concentrically encircle sensing wheel 50 for about 200° of its expanse at a radial spacing therefrom of about 0.0625". The terminals of heating element 85 extend into bores 86, so that electrical connections therewith can be readily effected via leads 47 inserted through ports 87, with electrical contacting surfaces squeezed together by set screws (not shown) threaded into tapped bores 88 provided in the two ends of support 84. Blind bore 89 is provided at the base of the heater for lock engagement with the lower end of spring retainer 79.

Speed of rotation of shaft 37 is readily verified by the use of a conventional magnetic transducer 91 disposed radially outwards of aluminum disc 92 (refer also FIG. 9), fixedly attached to shaft 37 by set screw 92a. Disc 92 is flattened over approximately 30° of the periphery in diametrically opposed regions and is provided at these points with a brass screw 93 and a steel screw 94 tapped radially into the disc diametrically opposite one another. Thus, upon each revolution of shaft 37 steel screw 94 sweeps past the face of transducer 91, thereby producing, by induction, an electrical pulse which, by passage through leads 95, connected with a pulse counter, not shown, furnishes a very accurate r.p.m. count.

Referring now to FIGS. 12 and 13, all elements shown in FIG. 12, except the potentiometer 100, are integral parts of the apparatus of FIGS. 1A and 1B and are housed therewithin, whereas FIG. 13 details the power and control circuitry external of the test apparatus.

The power source 101, FIG. 13, comprises a simple electrical plug adapted to plug-in connection with the usual 60 c., 115 v., lighting circuit supply mains, not shown, and has two power output leads 102 and 103, in one of which is connected overload fuse 104. A double-pole, single-throw power switch $S_1$, with contacts $S_1A$ and $S_1B$, is connected across power-on indicator lamp 107 and regulable power selection resistor 108, which latter is provided with a primary transformer winding 109 in series circuit with the tap 108a thereof. This power selector can be a conventional Powerstat Type 10B, 110 v. 1.75 amp. size adapted to supply enough electrical power to reference heater 78 to enable it to heat, by radiation and convection, surfaces in confrontation with it, such as the periphery of sensing wheel 50 and thermocouple hot junction 68. The secondary winding 110 of the transformer is the heating power supply of reference heater 78, to which it is connected via pins H and I of pin connector 112, to the opposite corresponding terminals of which individual leads 47 (FIG. 12) connect.

One power supply connection to motor 11 is via pin A, connecting directly with the contact $S_1A$, whereas the other power supply connection is via either pin B or pin C of pin connector 112, depending upon the setting of double-pole double-throw reversing switch 115 in series connection with contact $S_1B$, across the output sides of which switch capacitor 116 is connected to provide a slight time delay insuring unambiguous preselected direction of motor operation. The remaining pins of pin connector 112 are reserved, D and E for connection to a rotation counter responsive to magnetic transducer 91, and F as a safety connection to ground.

Referring to FIG. 12, the thermocouple leads from hot junction 68 go to individual cold junction slip ring assemblies 26 and 30, respectively, with draw off of the E.M.F. signal which is a function of the temperature to which hot junction 68 is exposed via terminals 26c and 30c.

In operation, switches $S_1$ and 115 are closed and, after a suitable interval, typically one minute, which is allowed for heat up of reference heater 78, sensing wheel 50, rotating at a peripheral speed approximately equal to that of the running yarn or other sample under investigation, is brought to bear, via groove 57, into contact with the sample. This brings thermocouple hot junction 68 into contact once during each revolution of wheel 50 with the running sample. Thus, the hot junction is exposed cyclically and alternately to the radiant and convective heat output of reference heater 78 and then to the conductive heat of sample 70. Now, if the operator takes an E.M.F. reading on potentiometer 100 for the two conditions: (1) when hot junction 68 is cyclically in and out of contact with the sample and (2) when sensing wheel 50 is removed from the sample entirely, i.e., when running free with hot junction 68 viewing reference heater 78 solely, the difference in the two E.M.F. readings will constitute the approximate difference in magnitude of the temperature levels of hot junction 68 free of sample and in contact with sample 70, respectively. The operator then adjusts tap 108a of regulable heating power selection resistor 108 either up or down in a direction tending to bring the two temperature levels to equality, i.e., the null point.

This procedure is repeated several times, typically two, three or four, with the objective being to bracket the exact equality condition on successive pairs of test readings. With a little practice it is possible to achieve near equality of the two temperature levels to within about 1.5–2.0° C. without any difficulty and within a minute or slightly longer time of test, at which point the sample can be considered to have a temperature equal to that of the thermocouple exposed to reference heater 78 solely, the numerical value of which is available from a temperature calibration curve for the thermocouple.

The importance of taking into account the effect of differential velocity between the running sample and sensing wheel 50 is demonstrated by the following test data. In this instance an $Al_2O_3$-$SiO_2$-$MgO$ ("AlSiMag") sensing wheel provided with an uncoated thermocouple was compared with a polytetrafluoroethylene-coated sensing wheel, and thermocouple, both thermocouples being chromel-constantan stainless steel-sheathed TCRC–FS–25 types mounted as cantilevers ¼" long. In all instances where a polytetrafluoroethylene coating was applied to the thermocouple hot junctions, this was effected by spray application of a resinous emulsion followed by heat curing in an oven heated to 600–700° F., thereby forming a 3 mil thick coating over the hot junction.

Both sensing wheels were driven at a surface speed of 500 ft./min. and a surface-dry nylon yarn of 70 denier weight, 34 filament make-up was used as the running sample 70. The yarn was drawn over the sensing wheels in a one-time pass and was at room temperature (73° F.) as supplied. Under these circumstances no power was supplied to reference heater 78, so that operation was not conducted as a null system and the temperature determinations were based on a previously acquired thermocouple temperature calibration.

Results at two widely different yarn velocities were as follows:

| Test No. | Yarn Velocity, ft./min. | Yarn Tension, gms. | Yarn Frictional Temp., ° F. | |
|---|---|---|---|---|
| | | | "AlSiMag" Wheel | Polytetrafluoroethylene Coated Copper Wheel |
| 1 | 3,000 | 25 | 96 | 78.5 |
| 2 | 9,000 | 25 | 128 | 101 |

The foregoing data bears out the fact that the coefficient of friction between dry nylon yarn and "AlSiMag," measured as 0.3, and polytetrafluoroethylene, measured as only 0.04, has an exceedingly important effect on temperature measurements, due to the frictional heat supplied to the wheel and thermocouple as a result of differential velocity between wheel 50 and the yarn.

It is, of course, possible to compensate for such heat with the aid of plots of temperature rise vs. velocity difference, such as that shown in FIG. 14 for room temperature conditions, nylon yarn of the structure hereinbefore detailed, and a differential velocity span of 0–4500 ft./min.; however, operation under approximately equal surface speeds of sensing wheel and sample is much preferred, because of the cancellation of effects of a multiplicity of specific system factors which might not remain entirely consistent on a test-to-test basis.

The surprising effect of even a small degree of surface lubrication on differential speed is shown by the plot of FIG. 15. Here the sample was a polyester yarn bundle of 840 denier weight, 192 filaments composition, which was passed through a superheated steam atmosphere deliberately varied in temperature progressively from 110° C. to 130° C. immediately prior to temperature measurement by three different temperature measuring devices utilized individually in separate tests. A sensitive radiation gage was employed as a standard, and the temperature trace thereby obtained is plotted as curve X. Apparatus according to this invention provided with a sensing wheel measuring 0.95″ dia. rotated at 2000 r.p.m., equivalent to a constant surface speed of about 500 ft./min., carrying a type TCRC–FS–50 stainless steel-sheathed chromel-constantan thermocouple mounted as a ½″ long cantilever (not coated with polytetrafluoroethylene), gave temperature readings falling directly on curve X, so that there was virtually no difference in the readings. In contradistinction, the same gage design, with sensing wheel locked stationary, produced a temperature plot Y possessed of a gross temperature displacement resulting from inter-yarn-sensing wheel friction heat. This comparative test reveals the relative suppression of differential velocity error contribution where the sample surface is lubricated, as by water droplets formed by steam condensation or the like.

It is sometimes desirable to employ a relatively broad hot thermocouple junction where temperature measurements are to be made on film or yarn warps, as an example, and a preferred design is shown in FIGS. 10 and 11. Here the cantilever is a transversely curved strip of stainless steel 120, typically 40 mils wide x 20 mils thick, mounted as a cantilever ¼″–½″ long, anchored in epoxy resin in a manner analogous to that described with reference to the design of FIG. 2. The region underlying the foil is buffed away to form a depression 121 centrally of the strip, within which is mounted the thermocouple hot junction indicated generally at 122, which is an overlapped strip, typically 2–5 mils wide, of the two dissimiliar metals making up the junction. The junction is electrically insulated from strip 120 by cemented attachment to the upper side of a polymeric film base, such as a polyester film 124 (typically 0.003″ thick) fixedly mounted within depression 121 with epoxy cement. This film base, together with the strip underlying it, is drilled at 125 and 126, to receive the thermocouple lead wires 127 and 128, respectively, which are affixed in place on the under-surface of strip 120 with a dab of epoxy cement 130.

One element of the hot junction 122 is a constantan foil 132 of thickness, typically, 0.0005″, joined in electrically conductive circuit with lead 127, whereas the other is a strip of copper 133 (also typically 0.0005″ thick) electrically plated on to the forward edge of the constantan, with a trailing portion 133a sputtered on to provide a good electrical connection with lead 128. The central portion of the junction is exposed to air temperature equalization by the provision of a drilled bore 135, typically, 10 mils in dia., extending through cement 130 to the underside of foil 132.

Preferably, the upper surface of hot junction 122 is mounted 0.001–0.002″ below the periphery of the sensing wheel (not shown) upon which the thermocouple is mounted, centrifugal force accompanying rotation of the sensing wheel biasing strip 120 radially outwards enough to bring the hot junction firmly into contact with the running film under investigation.

The operation of this embodiment is in all respects similar to that hereinbefore described with reference to FIG. 2, the course of the film in process being in the direction of the arrow, FIG. 11, so that the film clears the recessed leading edge of strip 120 and passes flush with, and smoothly over, the thermocouple hot junction 122, which is coplanar with the outside crown of strip 120, without snagging difficulties.

On the basis of operating experience, the following sensing wheel 50 gross diameters have proved satisfactory at the running sample speeds indicated:

| Maximum speed, ft./min.: | Sensing wheel dia., inches |
|---|---|
| 500 | 1 |
| 1000 | 2 |
| 5000 | 10 |

The term "power-driven sensing wheel," as used in the claims, is intended to comprehend not only the direct motor drive of the sensing wheel but also the drag rotation of the sensing wheel resulting from frictional contact of the sample with either groove 57 or a companion groove concentric therewith, and preferably heat-insulated from, the temperature-sensing groove. In this operation the wheel, once brought up to the sample running speed, will coast long enough to effect an accurate temperature reading before the differential velocity between sample and wheel becomes so great as to contribute an error in the determination, as hereinbefore described. This frictional speed-up is a less preferred way of operation, however, and a variable speed motor, such as one incorporating frequency divider rotational speed selection, is definitely superior. Also, while it is preferred to utilize mercury slip-ring assemblies of the type hereinbefore detailed incorporating relatively large masses which contribute desirable thermal inertia for steady cold junction temperature maintenance and enhanced thermocouple circuit operating stability, it is practicable to operate with slip rings of any design broadly, and no limitation is therefore implied in this regard.

From the foregoing, it will be understood that this invention can be modified in numerous respects within the skill of the art without departure from its essential spirit, and limitation is therefore intended only within the scope of the appended claims.

What is claimed is:

1. A method for measuring the temperature of running yarns, webs and the like comprising, in sequence, (1) rotating a thermocouple cyclically into and out of contact with an object the temperature of which is to be determined in a sense generally co-directional with the direction of travel of said object during a portion of each cycle of rotation followed by exposing said thermocouple to the heat output of a reference heater during at least a portion of the remainder of said cycle of rotation, (2) removing said thermocouple from cyclic contact with said object but continuing said exposing of said thermocouple to said heat output of said reference heater, determining the direction and approximate magnitude of heat transfer occurring between (1) and (2) with respect to said thermocouple in the course of said cyclic contact of said thermocouple with said object, adjusting said heat output of said reference heater so that said thermocouple and said object are at substantially the same temperature level, and then obtaining an indication of said temperature level as a function of the E.M.F. output of said thermocouple.

2. An apparatus for measuring the temperature of running yarns, webs and the like comprising, in combination, a power-driven sensing wheel for contacting the object whose temperature is to be determined, a reference heater regulable to heat the peripheral surface of said sensing wheel to equality of temperature level with the object the temperature of which is to be determined, said heater being disposed radially outward of and in close proximity to the periphery of said sensing wheel over a part of the circumference of said sensing wheel, a thermocouple mounted on the periphery of said sensing wheel and electrically insulated therefrom in a position cyclically contacting said object the temperature of which is to be determined and thereafter passing in close proximity to said reference heater, a pair of slip rings in electrical circuit one each with the individual leads of said thermocouple, and a galvanometer connected across the output sides of said pair of slip rings to verify the obtainment of near equality of the temperature of said thermocouple and the temperature of said object by a substantially unchanged E.M.F. reading between the two conditions: (1) where said sensing wheel and said thermocouple are out of cyclic contact with and (2) where said sensing wheel and said thermocouple are in cyclic contact with said object.

3. An apparatus for measuring the temperature of running yarns, webs and the like according to claim 2 wherein said thermocouple is mounted on said sensing wheel as a cantilever wherein the outboard unrestrained end cyclically contacts said object the temperature of which is to be determined.

4. An apparatus for measuring the temperature of running yarns, webs and the like according to claim 2 wherein said slip rings are of the mercury bath type.

References Cited by the Examiner

UNITED STATES PATENTS

| 2,007,118 | 7/1935 | Bosomwerth | 73—351 X |
| 3,204,462 | 9/1965 | Horne | 73—359 |
| 3,246,519 | 4/1966 | Dornberger | 73—359 X |

LOUIS R. PRINCE, *Primary Examiner.*

D. McGIEHAN, *Assistant Examiner.*